United States Patent
Tsuji

(10) Patent No.: US 10,174,237 B2
(45) Date of Patent: Jan. 8, 2019

(54) THERMAL CONDUCTIVE SILICONE COMPOSITION

(71) Applicant: SHIN-ETSU CHEMICAL CO., LTD., Tokyo (JP)

(72) Inventor: Kenichi Tsuji, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 32 days.

(21) Appl. No.: 15/550,863

(22) PCT Filed: Feb. 8, 2016

(86) PCT No.: PCT/JP2016/053689
§ 371 (c)(1),
(2) Date: Aug. 14, 2017

(87) PCT Pub. No.: WO2016/140020
PCT Pub. Date: Sep. 9, 2016

(65) Prior Publication Data
US 2018/0022977 A1 Jan. 25, 2018

(30) Foreign Application Priority Data
Mar. 2, 2015 (JP) .................................. 2015-039908

(51) Int. Cl.
| | | |
|---|---|---|
| *C09K 5/14* | (2006.01) | |
| *C09K 5/10* | (2006.01) | |
| *C08K 3/08* | (2006.01) | |
| *C08K 3/22* | (2006.01) | |
| *C08L 83/04* | (2006.01) | |
| *C08G 77/12* | (2006.01) | |
| *C08G 77/18* | (2006.01) | |
| *C08G 77/20* | (2006.01) | |

(52) U.S. Cl.
CPC .................. *C09K 5/14* (2013.01); *C08K 3/08* (2013.01); *C08K 3/22* (2013.01); *C08L 83/04* (2013.01); *C09K 5/10* (2013.01); *C08G 77/12* (2013.01); *C08G 77/18* (2013.01); *C08G 77/20* (2013.01); *C08L 2205/025* (2013.01); *C08L 2205/03* (2013.01)

(58) Field of Classification Search
CPC .................. C08G 77/12; C08G 77/20
See application file for complete search history.

(56) References Cited

U.S. PATENT DOCUMENTS

| 7,510,998 B2 | 3/2009 | Yamada et al. |
| 2005/0256259 A1 | 11/2005 | Goto et al. |
| 2008/0213578 A1* | 9/2008 | Endo ....................... C08L 83/04 428/334 |

FOREIGN PATENT DOCUMENTS

| JP | 8-295737 A | 11/1996 |
| JP | 2938428 B1 | 8/1999 |
| JP | 2938429 B1 | 8/1999 |
| JP | 2005-325211 A | 11/2005 |
| JP | 2005-330426 A | 12/2005 |
| JP | 3952184 B2 | 8/2007 |
| JP | 2009-221310 A | 10/2009 |
| JP | 2013-222836 A | 10/2013 |

OTHER PUBLICATIONS

International Search Report for PCT/JP2016/053689 (PCT/ISA/210) dated Mar. 1, 2016.
Written Opinion of the International Searching Authority for PCT/JP2016/053689 (PCT/ISA/237) dated Mar. 1, 2016.

* cited by examiner

*Primary Examiner* — Kuo Liang Peng
(74) *Attorney, Agent, or Firm* — Birch, Stewart, Kolasch & Birch, LLP

(57) ABSTRACT

Provided is a thermal conductive silicone composition exhibiting no peeling of a heat dissipation grease and capable of maintaining a low thermal resistance, even under a severe condition. The thermal conductive silicone composition contains:
(A) an organopolysiloxane having at least two alkenyl groups in one molecule and exhibiting a kinetic viscosity of 10 to 100,000 mm$^2$/s at 25° C.;
(B) a one-terminal-trifunctional hydrolyzable methylpolysiloxane;
(C) an aluminum powder;
(D) a zinc oxide powder;
(E) an organohydrogenpolysiloxane;
(F) an organohydrogenpolysiloxane other than the component (E); and
(G) a platinum-based catalyst for hydrosilylation, wherein when a liquid obtained by mixing and dispersing the composition in toluene which is twice the amount of the composition has been sieved, a residue of not more than 5 ppm will be observed if using a 250 mesh sieve, and a residue of not less than 200 ppm will be observed if using a 440 mesh sieve.

6 Claims, No Drawings

THERMAL CONDUCTIVE SILICONE COMPOSITION

TECHNICAL FIELD

The present invention relates to a thermal conductive silicone composition that will not be peeled from a base material and still be able to exhibit a favorable heat dissipation property, even when mounted on a heat-emitting element producing a significant degree of warpage, and then subjected to a severe environment for a heat cycle test.

BACKGROUND ART

It has been widely known that electronic parts such as LSIs and IC chips produce heat during use, and that their performances will thus be impaired due to such heat. Various heat dissipation techniques have been employed to solve this problem. For example, there is known a technique of disposing a cooling member such as a heat sink in the vicinity of a heat-emitting portion, and then allowing the two to come into close contact with each other so as to facilitate an efficient heat transmission from the heat-emitting portion to the cooling member, thereby allowing the heat of the heat-emitting portion to be efficiently dissipated. At that time, air which has a lower thermal conductivity resides in any gap between the heat-emitting portion and the cooling member such that heat transmission will become inefficient, and that the temperature of the heat-emitting portion will thus fail to decrease sufficiently. In order to avoid this phenomenon, there have been used heat dissipation materials having favorable thermal conductivities and conformable surfaces, such as a heat dissipation sheet and a heat dissipation grease (Patent documents 1 to 3), for the purpose of preventing air from residing in between the heat-emitting portion and the cooling member. Particularly, heat dissipation greases exhibit high performances in terms of heat resistance, since they can be used in a thinner form in a package.

Also, in order to further improve the heat dissipation property, there has been studied a technique of reducing thermal resistance by making a heat dissipation grease used in a package thinner and improving the thermal conductivity of the heat dissipation grease itself (Patent document 4).

PRIOR ART DOCUMENT

Patent Document

Patent document 1 Japanese Patent No. 2938428
Patent document 2 Japanese Patent No. 2938429
Patent document 3 Japanese Patent No. 3952184
Patent document 4 JP-A-2005-330426

SUMMARY OF THE INVENTION

Problem to be Solved by the Invention

However, in recent years, semiconductor chips themselves have become thinner and larger, and organic resin substrates are being increasingly used as substrates instead of ceramic substrates. Due to these kinds of reasons, a larger stress has been observed on a heat dissipation grease in a package. Reducing the thickness of the heat dissipation grease in the package under such circumstance leads to the following problems. Specifically, when subjected to a heat cycle test with a severe condition such as −55° C. to 170° C., the heat dissipation grease is incapable of conforming with a chip that has deformed due to thermal history. Thus, peeling of the heat dissipation grease may occur, and in the worst case scenario, the chip may also be damaged, which will then lead to an inferior reliability as a product.

In this way, it is an object of the present invention to provide a thermal conductive silicone composition exhibiting no peeling of a heat dissipation grease and capable of maintaining a low thermal resistance, even under a severe condition in a reliability test, such as a condition of −55° C. to 170° C. in a heat cycle test.

Means to Solve the Problem

In view of the aforementioned facts, the inventors of the invention diligently conducted a series of studies, and completed the invention as follows. That is, the inventors found that the aforementioned problems could be solved by employing a thermal conductive silicone composition containing the following components (A) to (G), and further using a filler having an appropriate particle size distribution to control a sieve residue of the composition.

The present invention is to provide the following thermal conductive silicone composition and a heat dissipation material using the same.

[1]

A thermal conductive silicone composition comprising:

(A) an organopolysiloxane having at least two alkenyl groups in one molecule and exhibiting a kinetic viscosity of 10 to 100,000 mm$^2$/s at 25° C.;

(B) a single-end-trifunctional hydrolyzable methylpolysiloxane that is in an amount of 50 to 130 parts by mass per 100 parts by mass of the component (A), and is represented by a general formula (1):

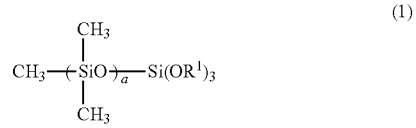

wherein R$^1$ represents an alkyl group having 1 to 6 carbon atoms, and a represents an integer of 5 to 100;

(C) an aluminum powder having an average particle diameter of 7 to 16 μm;

(D) a zinc oxide powder having an average particle diameter of not larger than 2 μm, the components (C) and (D) being present in an amount at which a mass ratio {component (C)+component (D)}/{component (A)+component (B)} becomes 8.0 to 14.0, and at which a mass ratio between the components (C) and (D) {component (C)/component (D)} becomes 3.0 to 6.0;

(E) an organohydrogenpolysiloxane represented by a general formula (2):

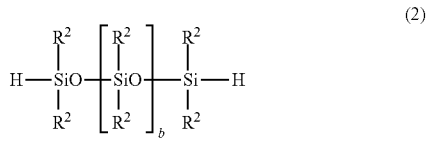

wherein R$^2$ represents an alkyl group having 1 to 6 carbon atoms, and b represents an integer of 5 to 100;

(F) an organohydrogenpolysiloxane other than the component (E), having at least two silicon atom-bonded hydrogen atoms in one molecule, the components (E) and (F) being present in an amount at which a value of {total number of silicon atom-bonded hydrogen atoms in components (E) and (F)}/{number of alkenyl groups in component (A)} becomes 0.5 to 1.5, and at which a ratio {number of silicon atom-bonded hydrogen atoms in component (E)}/{number of silicon atom-bonded hydrogen atoms in component (F)} becomes 0.6 to 5.0; and (G) a platinum-based catalyst for hydrosilylation that is in an amount at which platinum atoms are present in an amount of 0.1 to 500 ppm on mass basis with respect to the component (A), wherein when a liquid obtained by mixing and dispersing the thermal conductive silicone composition in toluene which is twice the amount of the composition has been sieved, a residue of not more than 5 ppm is observed if using a 250 mesh sieve (mesh size of 63 µm), and a residue of not less than 200 ppm is observed if using a 440 mesh sieve (mesh size of 32 µm).

[2]

The thermal conductive silicone composition according to [1], further comprising:

(H) a reaction control agent that is selected from an acetylene compound, a nitrogen compound, an organic phosphorous compound, an oxime compound and an organic chloro compound, and is in an amount of 0.1 to 5% on mass basis with respect to the component (A).

[3]

A heat dissipation material comprising the thermal conductive silicone composition as set forth in [1] or [2].

[4]

The heat dissipation material according to claim 3, wherein a cured product obtained by pressurizing the thermal conducive silicone composition as set forth in [1] or [2] under 0.15 MPa at room temperature for 15 min and then performing heating and curing at 150° C. for 90 min, has a thickness of 35 to 60 µm at room temperature.

Effects of the Invention

The thermal conductive silicone composition of the invention is capable of exhibiting a superior reliability without causing heat dissipation grease peeling, and maintaining a low thermal resistance, even under a severe condition in a reliability test such as a condition of −55° C. to 170° C. in a heat cycle test.

MODE FOR CARRYING OUT THE INVENTION

The invention is described in detail hereunder.

[Component (A)]

An organopolysiloxane as a component (A) has at least two silicon atom-bonded alkenyl groups in one molecule, may be either linear or branched, or may even be a mixture of two or more of them with different viscosities.

Examples of an alkenyl group to be bonded to a silicon atom(s) include an alkenyl group having 2 to 6 carbon atoms, such as a vinyl group, an allyl group, a 1-butenyl group and a 1-hexenyl group. Here, a vinyl group is preferred in terms of ease in synthesis and cost. Although the silicon atom-bonded alkenyl group may be present at either the terminals of or midway through the molecular chain of the organopolysiloxane, it is preferred that at least one of them be present at the terminals.

Examples of a residual organic group bonded to a silicon atom(s) include an alkyl group such as a methyl group, an ethyl group, a propyl group, a butyl group, a hexyl group and a dodecyl group; an aryl group such as a phenyl group; and an aralkyl group such as 2-phenylethyl group and 2-phenylpropyl group. Such residual organic group may also be a halogen atom-substituted hydrocarbon group such as a chloromethyl group and 3,3,3-trifluoropropyl group. Among these examples, a methyl group is preferred in terms of ease in synthesis and cost.

A kinetic viscosity of the component (A) at 25° C. is 10 to 100,000 mm$^2$/s, preferably 100 to 50,000 mm$^2$/s. Here, the kinetic viscosity refers to a value measured by an Ubbellohde-type Ostwald viscometer.

It is preferred that the component (A) be contained in the thermal conductive silicone composition of the invention by an amount of 2 to 10% by mass, more preferably 3 to 8% by mass.

[Component (B)]

A component (B) is a single-end-trifunctional hydrolyzable methylpolysiloxane represented by the following general formulae (1).

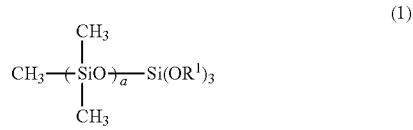

In the general formula (1), R$^1$ represents an alkyl group having 1 to 6 carbon atoms, examples of which include a methyl group, an ethyl group, a propyl group, an isopropyl group, a butyl group, a sec-butyl group, a tert-butyl group, a pentyl group and a hexyl group. Further, in the general formula (1), when a is smaller than 5, the composition may exhibit oil bleed in a terrible manner such that the reliably of the composition may be impaired; and when a is larger than 100, the wettability of the composition to fillers (components (C) and (D)) may be insufficient. Thus, a is an integer of 5 to 100, preferably an integer of 10 to 60.

When the single-end-trifunctional hydrolyzable methylpolysiloxane as the component (B) is added in an amount of smaller than 50 parts by mass per 100 parts by mass of the component (A), there cannot be expressed a sufficient wettability. Further, when the single-end-trifunctional hydrolyzable methylpolysiloxane as the component (B) is added in an amount of larger than 130 parts by mass per 100 parts by mass of the component (A), the composition will exhibit oil bleed in a severe manner such that the reliably thereof will be impaired. Thus, the single-end-trifunctional hydrolyzable methylpolysiloxane as the component (B) is added in an amount of 50 to 130 parts by mass, preferably 60 to 120 parts by mass, per 100 parts by mass of the component (A).

[Component (C)]

There are no particular restrictions on the shape of an aluminum powder as a component (C). The aluminum powder as the component (C) may, for example, have a spherical shape or an irregular shape, or even be surface-treated in advance. When the average particle diameter of this aluminum powder is smaller than 7 µm, the composition may become excessively thin in a way such that a poor reliability will be resulted. Further, when the average particle diameter of this aluminum powder is larger than 16 µm, the composition may become excessively thick in a way such that a high thermal resistance will be resulted, and that the performance of the composition may thus be impaired. Therefore, the average particle diameter of this aluminum powder is 7 to 16 µm, preferably 7 to 14 µm.

Particularly, in the present invention, the average particle diameter refers to a volume average diameter on volume basis that is measured by Microtrac MT3300EX manufactured by NIKKISO CO., LTD.

[Component (D)]

There are no particular restrictions on the shape of a zinc oxide powder as a component (D). The zinc oxide powder as the component (D) may, for example, have a spherical shape or an irregular shape. When the average particle diameter of the zinc oxide powder is larger than 2 μm, the composition may be poorly filled with such zinc oxide powder in a way such that the viscosity of the composition will rise, and that a poor extensibility will thus be exhibited. Therefore, the average particle diameter of the zinc oxide powder is 2 μm. When the average particle diameter of the zinc oxide powder is smaller than 0.1 μm, the composition obtained may also be poorly filled with such zinc oxide powder in a way such that the viscosity of the composition will rise. Therefore, it is preferred that the zinc oxide powder have an average particle diameter of 0.1 to 2 μm.

With regard to the amount of the components (C) and (D) added, when the value of a mass ratio {total amount of components (C) and (D) added}/{total amount of components (A) and (B) added} is smaller than 8, the thermal conductivity of the composition will decrease in a way such that the performance of the composition will be impaired. Further, when the value of such mass ratio is larger than 14, the viscosity of the composition will rise in a way such that a poor extensibility will be resulted. Thus, the components (C) and (D) are added in an amount at which the value of the above mass ratio becomes 8.0 to 14.0, preferably 8.0 to 13.5.

Moreover, when {component (C)/component (D)}, a mass ratio between the component (C) and the component (D), is smaller than 3.0, the composition will become excessively thin in a way such that the reliability thereof will be impaired. Further, when such mass ratio is larger than 6.0, the composition will become excessively thick in a way such that the thermal resistance thereof will rise. Thus, it is favorable that this mass ratio be 3.0 to 6.0, preferably 3.5 to 5.5.

[Component (E)]

A component (E) is an organohydrogenpolysiloxane represented by the following general formula (2).

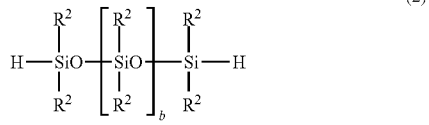

(2)

In the general formula (2), $R^2$ may be an alkyl group selected from, for example, a methyl group, an ethyl group, a propyl group, a butyl group and a hexyl group. Among these groups, a methyl group is preferred in terms of ease in synthesis and cost. Further, in the general formula (2), when b is smaller than 5, the component (E) will become a volatile component which is not preferable for use in an electronic part. Also, when b is larger than 100, the viscosity of the composition will rise in a way such that it will be difficult to handle the composition. Thus, it is favorable that b be 5 to 100, preferably 5 to 80.

[Component (F)]

A component (F) is an organohydrogenpolysiloxane other than that of the component (E). Since the organohydrogenpolysiloxane as the component (F) serves to turn the structure of the composition into a net-like structure through cross-linking, it has at least two silicon atom-bonded hydrogen atoms (i.e. Si—H group) in one molecule. The organohydrogenpolysiloxane as the component (F) may be linear, branched or circular; or even a mixture thereof.

A residual organic group bonded to a silicon atom(s) in the component (F) may be a monovalent hydrocarbon group other than an aliphatic unsaturated hydrocarbon group.

Particularly, such residual organic group may be a saturated or unsaturated monovalent hydrocarbon group having 1 to 12, preferably 1 to 10 carbon atoms. Examples of such residual organic group include an alkyl group such as a methyl group, an ethyl group, a propyl group, a butyl group, a hexyl group and a dodecyl group; an aryl group such as a phenyl group; an aralkyl group such as 2-phenylethyl group and 2-phenylpropyl group; and a halogen atom-substituted hydrocarbon group such as a chloromethyl group and 3,3,3-trifluoropropyl group. Other examples of such residual organic group include epoxy ring-containing organic groups such as 2-glycidoxyethyl group, 3-glycidoxypropyl group and 4-glycidoxybutyl group.

A linear organohydrogenpolysiloxane as the component (F) may, for example, be an organohydrogenpolysiloxane represented by the following general formula (3).

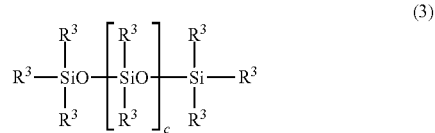

(3)

In the formula (3), $R^3$ represents a hydrogen atom; or a substituted or unsubstituted monovalent hydrocarbon group other than an aliphatic unsaturated hydrocarbon group. The multiple $Ra_s$ may be either identical to or different from one another, and at least two of them are hydrogen atoms. As the substituted or unsubstituted monovalent hydrocarbon group other than an aliphatic unsaturated hydrocarbon group, there may be employed the abovementioned organic groups. It is preferred that c be an integer of 0 to 1,000, more preferably an integer of 2 to 100.

A branched organohydrogenpolysiloxane as the component (F) may, for example, be an organohydrogenpolysiloxane represented by the following general formula (4).

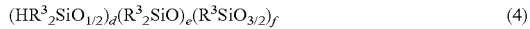

$(HR^3{}_2SiO_{1/2})_d(R^3{}_2SiO)_e(R^3SiO_{3/2})_f$ (4)

In the formula (4), $R^3$ represents a substituted or unsubstituted monovalent hydrocarbon group other than an aliphatic unsaturated hydrocarbon group. The multiple $R^3$s may be either identical to or different from one another, and specific examples of such $R^3$ include the aforementioned organic groups. d represents a number of 0.005 to 0.3, e represents a number of 0.5 to 0.98, and f represents a number of 0.01 to 0.12, provided that d+e+f=1.

Particularly, preferred is an organohydrogenpolysiloxane having at least three silicon atom-bonded hydrogen atoms in one molecule and at least two ($R^3SiO_{3/2}$) units in one molecule, and exhibiting a kinetic viscosity of 10 mm²/s to 500 mm²/s at 25° C.

Further, as a preferable example of the organohydrogenpolysiloxane represented by the above general formula (4), there may be employed an organohydrogenpolysiloxane represented by the following general formula (5).

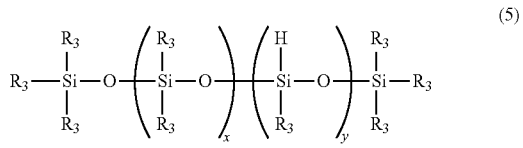

In the formula (5), $R^3$ represents a substituted or unsubstituted monovalent hydrocarbon group other than an aliphatic unsaturated hydrocarbon group. The multiple $R^3$s may be either identical to or different from one another, and specific examples of such $R^3$ include the aforementioned organic groups. x represents an integer of 10 to 100, and y represents an integer of 2 to 20.

Further, a circular organohydrogenpolysiloxane as the component (F) may, for example, be an organohydrogenpolysiloxane represented by the following general formula (6).

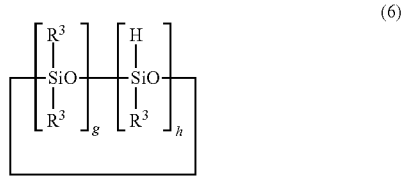

In the formula (6), $R^3$ represents a substituted or unsubstituted monovalent hydrocarbon group other than an aliphatic unsaturated hydrocarbon group. The multiple $R^3$s may be either identical to or different from one another, and specific examples of such $R^3$ include the aforementioned organic groups. It is preferred that g represent an integer of 0 to 5, and h represent an integer of 2 to 5, provided that g+h equals 3 to 7.

With regard to the amount of the components (E) and (F) added, when the value of a ratio {total number of silicon atom-bonded hydrogen atoms in components (E) and (F)}/{number of alkenyl groups in component (A)} is smaller than 0.5, the structure of the composition cannot be sufficiently turned into a net-like structure in a way such that grease pump-out may occur. Further, when such ratio is larger than 1.5, the crosslink density of the composition will become excessively high in a way such that peeling may occur during a reliability test. Therefore, the components (E) and (F) are added in an amount at which this ratio becomes 0.5 to 1.5, preferably 0.7 to 1.3.

In addition, when a ratio {number of silicon atom-bonded hydrogen atoms in component (E)}/{number of silicon atom-bonded hydrogen atoms in component (F)} is smaller than 0.6, the crosslink density of the composition will become excessively high in a way such that peeling may occur during a reliability test. Further, when this ratio is larger than 5.0, grease pump-out may occur. Therefore, the components (E) and (F) are preferably added in an amount at which this ratio becomes 0.6 to 5.0.

[Component (G)]

A platinum-based hydrosilylation catalyst as a component (G) serves as a component for promoting an addition reaction between the alkenyl groups in the component (A) and the Si—H groups in the components (E) and (F). The component (G) is a catalyst selected from platinum and a platinum compound. Examples of such component (G) include elemental platinum, chloroplatinic acid, a platinum-olefin complex, a platinum-alcohol complex and a platinum coordination compound. It is preferred that the component (G) be added in an amount at which platinum atoms will be present in an amount of 0.1 to 500 ppm on mass basis with respect to the component (A).

[Component (H)]

Other than the abovementioned essential components (A) to (G), a reaction control agent as a component (H) may also be added to the present invention if necessary.

The reaction control agent as the component (H) serves to restrict the progression of hydrosilylation reaction at room temperature, and thus extend shelf life and pot life. As such reaction control agent, there can be employed a conventionally known agent used in an addition reaction-curable silicone composition. Examples of such agent include an acetylene compound such as 1-ethynyl-1-cyclohexanol and 3,5-dimethyl-1-hexine-3-ol; various nitrogen compounds such as tributylamine, tetramethylethylenediamine and benzotriazole; an organic phosphorous compound such as triphenylphosphine; an oxime compound; and an organic chloro compound.

It is preferred that the component (H) be added in an amount of 0.1 to 5% on mass basis with respect to the component (A). Further, the reaction control agent may also be diluted with toluene or the like before use, for the purpose of improving the dispersibility thereof to the composition.

Further, other than the aforementioned components, an antioxidant or the like may also be added to the present invention if necessary, for the purpose of preventing deterioration.

A method for producing the thermal conductive silicone composition of the invention may be performed in accordance with a method for producing a conventional thermal conductive silicone composition, and there are no particular restrictions on the method of the present invention. For example, the thermal conductive silicone composition of the invention can be produced by mixing the components (A) to (G) and other components if necessary, using a mixer such as Trimix, Twin Mix and Planetary Mixer (all being the registered trademarks of mixers manufactured by INOUE MFG., INC.); Ultra Mixer (registered trademark of a mixer manufactured by MIZUHO INDUSTRIAL CO., LTD); and Hivis Disper Mix (registered trademark of a mixer manufactured by PRIMIX Corporation).

The thermal conductive silicone composition of the invention is such that when a liquid obtained by mixing and dispersing the composition in toluene which is twice the amount of such composition has been sieved, a residue of not more than 5 ppm will be observed if using a 250 mesh sieve (mesh size of 63 μm), and a residue of not less than 200 ppm will be observed if using a 440 mesh sieve (mesh size of 32 μm).

A sieve residue test of the present invention can, for example, be performed through the following method.

The liquid obtained by mixing and dispersing the thermal conductive silicone composition of the invention in toluene which is twice the amount of such composition, is made to pass through the 250 mesh sieve (mesh size of 63 μm) or the 440 mesh sieve (mesh size of 32 μm), followed by thoroughly washing the sieve with a washing toluene. Later, the coarse grains that have remained on the mesh are put into a dryer so as to be dried, followed by taking the dried residue on a piece of weighting paper to measure the mass thereof and then calculate the ratio of the residue in the composition.

When the amount of the residue obtained after using the 250 mesh sieve (mesh size of 63 μm) is greater than 5 ppm, the composition will become excessively thick in actual use, such that a high thermal resistance will be exhibited. Therefore, it is favorable that the amount of such residue be not larger than 5 ppm, preferably not larger than 2 ppm. Further, when the amount of the residue obtained after using the 440 mesh sieve (mesh size of 32 μm) is smaller than 200 ppm, the composition will become excessively thin in actual use, such that the composition may be peeled from a base material during a reliability test. Therefore, it is favorable that the amount of such residue be not smaller than 200 ppm. It is preferred that an upper limit of the residue obtained after using the 440 mesh sieve (mesh size of 32 μm) be not more than 20% by mass, more preferably not more than 15% by mass. When such upper limit is greater than 20% by mass, the thickness of a cured product cured under the following conditions may exceed 60 μm. In order to control the amount of residue to 5 ppm or smaller when using the 250 mesh sieve (mesh size of 63 μm), and 200 ppm or larger when using the 440 mesh sieve (mesh size of 32 μm), given amounts of the components (A) and (B) may simply be mixed together using a filler capable of yielding the above residue ratio.

The thickness of the heat dissipation material of the invention is measured as follows. That is, the composition of the invention is to be sandwiched between plates so as to be pressurized under 0.15 MPa at room temperature for 15 min. Under such condition, the composition is then cured after being heated at 150° C. for 90 min. The cured composition is then cooled to room temperature before measuring the thickness thereof, and it is preferred that this thickness be 35 to 60 μm. When such thickness is less than 35 μm, peeling of the composition may occur during a reliability test. Further, when such thickness is more than 60 μm, the thermal resistance of the composition will rise in a way such that a heat dissipation property may be impaired. In order to obtain such a kind of heat dissipation material, adjustments may simply be made to meet the aforementioned residue amount, and such residue amount can be adjusted through a method known to those skilled in the art.

WORKING EXAMPLE

The present invention is described in detail hereunder with reference to working and comparative examples. However, the present invention is not limited to the following working examples.

Evaluation and measurement methods are shown below.
Viscosity
The absolute viscosity of the thermal conductive silicone composition was measured at 25° C., using a Malcom viscometer (Type PC-1TL).
Thermal Conductivity
The thermal conductivity of the thermal conducive silicone composition was measured as follows. That is, each composition was poured into a mold having a thickness of 3 cm, and a piece of kitchen wrap was then placed thereon before measuring the thermal conductivity of the composition with Model QTM-500 manufactured by Kyoto Electronics Manufacturing Co., Ltd.
Elastic Modulus Evaluation
The thermal conductive silicone composition was applied by a thickness of 2 mm in between two parallel plates each having a diameter of 2.5 cm. A program was then created such that the temperature of the coated plates would rise from 25° C. at a rate of 5° C./min, and that such temperature would then be maintained for 120 min after reaching 150° C. A storage elastic modulus G' and a loss elastic modulus G" were then measured. The measurement was performed using a viscoelasticity measuring device (Type RDA III by Rheometric Scientific Inc.), and adopted was a numerical value observed 7,200 sec after the temperature had started rising.
Thickness and Thermal Resistance Measurement
The thermal conductive silicone composition was at first sandwiched in between a Si chip of a size of 15 mm×15 min×1 mmt and a Ni plate of a size of 15 mm×15 mm×1 mmt, followed by pressurizing the same under 0.15 MPa at room temperature for 15 min. Under such condition, the composition was then cured after being heated in an oven of 150° C. for 90 min, thus obtaining a test specimen. The cured composition was then cooled to room temperature, followed by measuring the thickness of the entire test specimen, and then subtracting therefrom the thicknesses of the Si chip and the Ni plate to obtain the thickness of the thermal conductive silicone composition.

Further, thermal resistance measurement (initial value) was performed using the test specimen that had been used to perform thickness measurement. Later, a thermal resistance of the test specimen that had been subjected to a heat cycle test (−55° C. to 170° C., 2,000 cycles) was measured in the similar manner as the initial value. Here, this thermal resistance measurement was performed using NanoFlash (LFA 447 by NETZSCH).
Sieve Residue Test
The thermal conductive silicone composition of 50 g was put into a 250 mL polyethylene bottle, and was mixed with toluene of 100 g therein, followed by shaking the polyethylene bottle for two hours to disperse the composition. A dispersion liquid thus prepared was then made to pass through the 250 mesh sieve (mesh size of 63 μm) or the 440 mesh sieve (mesh size of 32 μm), followed by using a washing toluene to wash the sieve, and then placing the sieve into a dryer so as to dry the same. The residue on the dried sieve was then taken on a piece of weighting paper to measure the mass of the sieve residue, and calculate the ratio of the sieve residue in the composition.

The components used in the working and comparative examples are listed below. Here, a kinetic viscosity refers to a value measured by an Ubbellohde-type Ostwald viscometer (by SIBATA SCIENTIFIC TECHNOLOGY) at 25° C. Further, an average particle diameter refers to a volume average diameter on volume basis that is measured by Microtrac MT3300EX (by NIKKISO CO., LTD.)
Component (A)
A-1: Dimethylpolysiloxane having both terminals blocked by dimethylvinylsilyl groups, and exhibiting a kinetic viscosity of 1,000 mm²/s at 25° C.
Component (B)
B-1: Single-end-trifunctional hydrolyzable methylpolysiloxane represented by the following formula

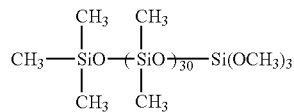

Component (C)
C-1: Aluminum powder having an average particle diameter of 12 μm
C-2: Aluminum powder having an average particle diameter of 8 μm
C-3 (for use in comparative example): Aluminum powder having an average particle diameter of 17 μm C-4 (for use in comparative example): Aluminum powder having an average particle diameter of 6 μm Component (D)

D-1: Zinc oxide powder having an average particle diameter of 0.6 μm

Component (E)

E-1: Organohydrogenpolysiloxane represented by the following formula

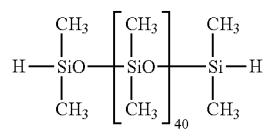

Component (F)

F-1: Organohydrogenpolysiloxane represented by the following formula

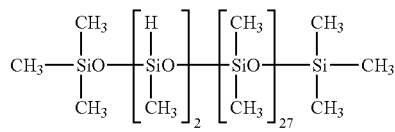

F-2: Organohydrogenpolysiloxane represented by the following formula

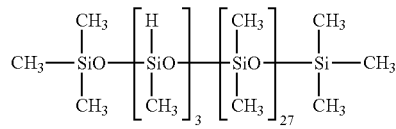

Component (G)

G-1: Solution obtained by dissolving platinum-divinyltetramethyldisiloxane complex in a dimethylpolysiloxane identical to A-1 (platinum atom content: 1% by mass)

Component (H)

H-1: 1-ethynyl-1-cyclohexanol

Working Examples 1 to 6; Comparative Examples 1 to 8

Compositions in working examples 1 to 6; and comparative examples 1 to 8 were obtained by mixing the components (A) to (H) as follows. That is, the component (A) was taken by an amount of 100 parts by mass and put into a 5 L planetary mixer (by INOUE MFG., INC.). The components (B), (C) and (D) in the given amounts (parts by mass) shown in Tables 1 and 2 were then added thereto, followed by mixing together these components (A), (B), (C) and (D) at 170° C. for an hour. A mixture thus obtained was then cooled to normal temperature, followed by adding thereto the components (E), (F), (G) and (H) in the given amounts (parts by mass) shown in Tables 1 and 2, and then performing mixing until a uniform level had been reached.

The abovementioned test was performed on each composition obtained.

TABLE 1

| Amount (part by mass) | Working example | | | | | |
| --- | --- | --- | --- | --- | --- | --- |
| | 1 | 2 | 3 | 4 | 5 | 6 |
| A-1 | 100 | 100 | 100 | 100 | 100 | 100 |
| B-1 | 100 | 100 | 120 | 65 | 75 | 80 |
| C-1 | 1610 | | 2430 | | 1440 | |
| C-2 | | 1750 | | 1090 | | 1520 |
| C-3 | | | | | | |
| C-4 | | | | | | |
| D-1 | 350 | 430 | 450 | 310 | 350 | 430 |
| Total of components (C) and (D)/Total of components (A) and (B) | 9.8 | 10.9 | 13.1 | 8.5 | 10.2 | 10.9 |
| Mass of component (C)/Mass of component (D) | 4.6 | 4.1 | 5.4 | 3.5 | 4.1 | 3.5 |
| E-1 | 9.2 | 15.5 | 14.5 | 13.1 | 9.3 | 13.6 |
| F-1 | 7.1 | | | 4.2 | | |
| F-2 | | 2.6 | 3.1 | | 7.5 | 1.6 |
| (Si—H in both components (E) and (F))/Si-Vi in component (A) (number ratio) | 1.0 | 1.1 | 1.1 | 1.0 | 1.3 | 0.9 |
| (Si—H group in component (E))/(Si—H group in component (F)) | 1.0 | 3.2 | 2.5 | 2.4 | 0.7 | 4.5 |
| G-1 | 0.30 | 0.30 | 0.30 | 0.30 | 0.30 | 0.30 |
| H-1 | 0.23 | 0.23 | 0.23 | 0.23 | 0.23 | 0.23 |
| Evaluation result | | | | | | |
| Viscosity (Pa · s) | 198 | 233 | 426 | 133 | 208 | 197 |
| Thermal conductivity (W/mK) | 4.3 | 4.5 | 5.7 | 3.7 | 4.4 | 4.5 |
| Storage elastic modulus G' (Pa) | 33420 | 21580 | 16890 | 32590 | 43160 | 21230 |
| Loss elastic modulus G'' (Pa) | 28100 | 26790 | 28530 | 18730 | 29240 | 36770 |
| Residue on 440 mesh sieve (ppm) | 573 | 280 | 708 | 214 | 512 | 233 |
| Residue on 250 mesh sieve (ppm) | 0 | 0 | 1 | 0 | 0 | 0 |
| Thickness (μm) | 46 | 39 | 58 | 37 | 47 | 39 |
| Thermal resistance (mm² · K/W) | 10.8 | 9.9 | 10.6 | 10.4 | 10.5 | 9.6 |
| Thermal resistance after heat cycle test (mm² · K/W) | 11.6 | 10.9 | 11.5 | 10.8 | 11.0 | 10.2 |

TABLE 2

| Amount (part by mass) | Comparative example | | | | | | | |
|---|---|---|---|---|---|---|---|---|
| | 1 | 2 | 3 | 4 | 5 | 6 | 7 | 8 |
| A-1 | 100 | 100 | 100 | 100 | 100 | 100 | 100 | 100 |
| B-1 | 100 | 100 | 120 | 65 | 75 | 80 | 100 | 100 |
| C-1 | | | 2630 | | 1660 | | 1610 | |
| C-2 | | | | 960 | | 1310 | | 1750 |
| C-3 | 1610 | | | | | | | |
| C-4 | | 1750 | | | | | | |
| D-1 | 350 | 430 | 490 | 270 | 260 | 450 | | |
| Total of components (C) and (D)/ Total of components (A) and (B) | 9.8 | 10.9 | 14.2 | 7.1 | 10.9 | 9.8 | | |
| Mass of component (C)/Mass of component (D) | 4.6 | 4.1 | 5.4 | 3.5 | 6.3 | 2.9 | | |
| E-1 | 9.2 | 15.5 | 14.5 | 13.1 | 9.3 | 13.6 | | |
| F-1 | 7.1 | | | 4.2 | | | | |
| F-2 | | 2.6 | 3.1 | | 7.5 | 1.6 | | |
| (Si—H in both components (E) and (F))/ Si-Vi in component (A) (number ratio) | 1.0 | 1.1 | 1.1 | 1.0 | 1.3 | 0.9 | | |
| (Si—H group in component (E))/(Si—H group in component (F)) | 1.0 | 3.2 | 2.5 | 2.4 | 0.7 | 4.5 | 0.5 | 5.2 |
| G-1 | 0.30 | 0.30 | 0.30 | 0.30 | 0.30 | 0.30 | 0.30 | 0.30 |
| H-1 | 0.23 | 0.23 | 0.23 | 0.23 | 0.23 | 0.23 | 0.23 | 0.23 |
| Evaluation result | | | | | | | | |
| Viscosity (Pa·s) | 202 | 239 | Failed to form grease | 108 | 261 | 197 | 221 | 252 |
| Thermal conductivity (W/mK) | 4.4 | 4.2 | | 3.0 | 4.1 | 3.7 | 4.4 | 4.4 |
| Storage elastic modulus G' (Pa) | 33630 | 20370 | | 33680 | 39280 | 19680 | 100420 | 8090 |
| Loss elastic modulus G" (Pa) | 27900 | 28820 | | 17200 | 24030 | 25430 | 28100 | 46520 |
| Residue on 440 mesh sieve (ppm) | 1031 | 140 | | 163 | 730 | 186 | 591 | 258 |
| Residue on 250 mesh sieve (ppm) | 8 | 0 | | 0 | 4 | 0 | 0 | 0 |
| Thickness (μm) | 72 | 29 | | 34 | 64 | 28 | 48 | 38 |
| Thermal resistance (mm²·K/W) | 18.9 | 8.1 | | 12.0 | 19.9 | 9.6 | 10.8 | 9.9 |
| Thermal resistance after heat cycle test (mm²·K/W) | 19.8 | 20.2 | | 18.8 | 20.2 | 18.4 | 21.3 | 19.2 |

The invention claimed is:

1. A thermal conductive silicone composition comprising:

(A) an organopolysiloxane having at least two alkenyl groups in one molecule and exhibiting a kinetic viscosity of 10 to 100,000 mm²/s at 25° C.;

(B) a one-terminal-trifunctional hydrolyzable methylpolysiloxane that is in an amount of 50 to 130 parts by mass per 100 parts by mass of the component (A), and is represented by a general formula (1):

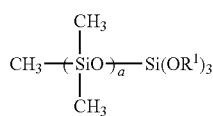

(1)

wherein $R^1$ represents an alkyl group having 1 to 6 carbon atoms, and a represents an integer of 5 to 100;

(C) an aluminum powder having an average particle diameter of 7 to 16 μm;

(D) a zinc oxide powder having an average particle diameter of not larger than 2 μm, the components (C) and (D) being present in an amount at which a mass ratio {component (C)+component (D)}/{component (A)+component (B)} becomes 8.0 to 14.0, and at which a mass ratio between the components (C) and (D) {component (C)/component (D)} becomes 3.0 to 6.0;

(E) an organohydrogenpolysiloxane represented by a general formula (2):

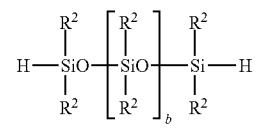

(2)

wherein $R^2$ represents an alkyl group having 1 to 6 carbon atoms, and b represents an integer of 5 to 100;

(F) an organohydrogenpolysiloxane other than the component (E), having at least two silicon atom-bonded hydrogen atoms in one molecule, the components (E) and (F) being present in an amount at which a value of {total number of silicon atom-bonded hydrogen atoms in components (E) and (F)}/{number of alkenyl groups in component (A)} becomes 0.5 to 1.5, and at which a ratio {number of silicon atom-bonded hydrogen atoms in component (E)}/{number of silicon atom-bonded hydrogen atoms in component (F)} becomes 0.6 to 5.0; and (G) a platinum-based catalyst for hydrosilylation that is in an amount at which platinum atoms are present in an amount of 0.1 to 500 ppm on mass basis with respect to the component (A), wherein when a liquid obtained by mixing and dispersing the composition in toluene which is twice the amount of the composition has been sieved, a residue of not more than 5 ppm is observed if using a 250 mesh sieve (mesh size of 63 μm), and a residue of not less than 200 ppm is observed if using a 440 mesh sieve (mesh size of 32 μm).

2. The thermal conductive silicone composition according to claim 1, further comprising:

(H) a reaction control agent that is selected from an acetylene compound, a nitrogen compound, an organic phosphorous compound, an oxime compound and an organic chloro compound, and is in an amount of 0.1 to 5% on mass basis with respect to the component (A).

3. A heat dissipation material comprising the thermal conductive silicone composition as set forth in claim 2.

4. The heat dissipation material according to claim 3, wherein a cured product obtained by pressurizing the thermal conducive silicone composition as set forth in claim 2 under 0.15 MPa at room temperature for 15 min and then performing heating and curing at 150° C. for 90 min, has a thickness of 35 to 60 μm at room temperature.

5. A heat dissipation material comprising the thermal conductive silicone composition as set forth in claim 1.

6. The heat dissipation material according to claim 5, wherein a cured product obtained by pressurizing the thermal conducive silicone composition as set forth in claim 1 under 0.15 MPa at room temperature for 15 min and then performing heating and curing at 150° C. for 90 min, has a thickness of 35 to 60 μm at room temperature.

* * * * *